(12) United States Patent
Hanna et al.

(10) Patent No.: US 7,437,935 B2
(45) Date of Patent: Oct. 21, 2008

(54) CONTINUOUS CHATTER BOUNDARY CRITERIA FOR MANUFACTURED PARTS

(75) Inventors: Ihab M. Hanna, Lake Orion, MI (US); Aleksandar J. Filipovic, West Bloomfield, MI (US); Jason J. Wiedyk, Essexville, MI (US); Bruce A. Tucker, Brighton, MI (US); Shane E. Bremer, Hope, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 406 days.

(21) Appl. No.: 11/372,918

(22) Filed: Mar. 10, 2006

(65) Prior Publication Data

US 2007/0056372 A1    Mar. 15, 2007

Related U.S. Application Data

(60) Provisional application No. 60/716,716, filed on Sep. 13, 2005.

(51) Int. Cl.
*G01B 21/00*    (2006.01)
*H04R 29/00*    (2006.01)
*G08B 21/00*    (2006.01)

(52) U.S. Cl. .............................. 73/646; 73/659; 73/660; 381/56; 381/58; 340/679; 340/683

(58) Field of Classification Search .................. 73/646, 73/659, 660; 381/56, 58; 340/679, 683
See application file for complete search history.

(56) References Cited

U.S. PATENT DOCUMENTS

| 3,747,703 | A | * | 7/1973 | Knowd et al. .................. 73/648 |
| 5,231,767 | A | * | 8/1993 | Brinley .......................... 33/533 |
| 5,392,781 | A | * | 2/1995 | Phillipps et al. ............. 600/493 |
| 2007/0127727 | A1 | * | 6/2007 | Jeong ........................... 381/17 |

* cited by examiner

*Primary Examiner*—Hezron E. Williams
*Assistant Examiner*—Jacques M. Saint-Surin

(57) ABSTRACT

A chatter boundary system includes a measuring module, a comparison module, and a boundary module. The measuring module measures and collects samples of undulations in a manufactured part. The comparison module classifies a sound signal generated by the undulations as either noisy or quiet. The boundary module determines a continuous boundary between the noisy and quiet undulations based on the samples and the sound signal.

20 Claims, 4 Drawing Sheets

CONTINUOUS CHATTER BOUNDARY CRITERIA FOR MANUFACTURED PARTS

CROSS-REFERENCE TO RELATED APPLICATIONS

This application claims the benefit of U.S. Provisional Application No. 60/716,716, filed on Sep. 13, 2005, which is incorporated herein by reference in its entirety.

FIELD OF THE INVENTION

The present invention relates to manufactured parts, and more particularly to determining a boundary to minimize noise generated from undulations along a surface of the manufactured parts.

BACKGROUND OF THE INVENTION

Manufacturing of camshafts often results in small undulations along cam lobe surfaces commonly referred to as chatter. During engine operation, valve lifter mechanisms roll and/or slide along the cam lobe surface encountering the surface undulations. Undulations having a certain amplitude and frequency may create objectionable levels of audible noise when the valve lifter mechanisms encounter the cam lobe surface. Therefore, a boundary between acceptable and unacceptable levels of noise due to the undulations is desired.

In one method to define the boundary, a maximum amplitude of the undulations is specified using piecewise threshold values within discrete frequency ranges. More specifically, multiple bins are created with discrete frequency bandwidths. The amplitude of the bins define the boundary between acceptable and unacceptable noise levels. However, experimental evidence suggests that the boundary between acceptable and unacceptable noise levels is not a discrete function. Therefore, the amplitude of the bin may be above or below the boundary for a portion of the bandwidth of the bin. Thus, some cam lobes with acceptable undulations may be rejected while some cam lobes with unacceptable undulations may be used.

SUMMARY OF THE INVENTION

A chatter boundary system according to the present invention includes a measuring module, a comparison module, and a boundary module. The measuring module measures and collects samples of undulations in a manufactured part. The comparison module classifies a sound signal generated by the undulations as either noisy or quiet. The boundary module determines a continuous boundary between the noisy and quiet undulations based on the samples and the sound signal.

In other features, the chatter boundary system includes a frequency domain module that communicates with the measuring module and that converts the samples into frequency domain samples. The boundary module plots the frequency domain samples classified as noisy versus a frequency of the undulations. The boundary module also plots the frequency domain samples classified as quiet versus the frequency of the undulations.

In still other features, the boundary module fits a curve between the noisy and quiet undulations to determine the continuous boundary. The boundary module fits the curve using a minimum value of the frequency domain samples for the frequency of the noisy undulations.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
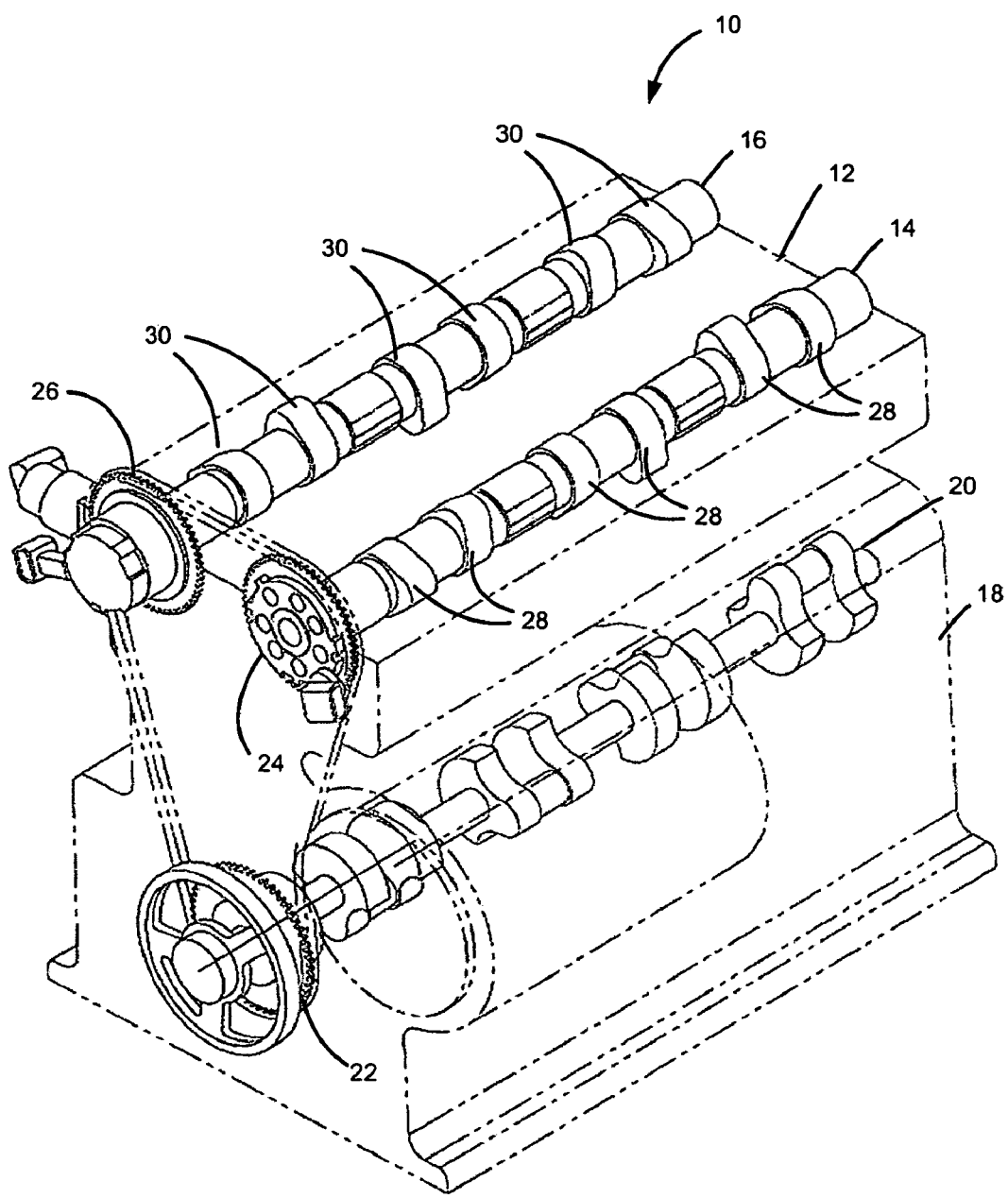
FIG. 1 is a perspective view of a portion of an engine, illustrating an intake and exhaust camshaft having respective cam lobes associated with a cylinder bank and a crankshaft.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a perspective view of a portion of an engine 10 is shown. The engine 10 includes a cylinder head 12 that supports an intake camshaft 14, an exhaust camshaft 16, and a cylinder block 18 that supports a crankshaft 20. Camshafts 14, 16 are each associated with a cylinder bank (not shown). The crankshaft 20 is interconnected to pistons (not shown) within the cylinder bank by connecting rods (not shown). The pistons are driven by a combustion process to provide a driving force that rotates the crankshaft 20. A sprocket 22 is fixed for rotation with the crankshaft 20 and is interconnected to an intake sprocket 24 and a exhaust sprocket 26 by a belt or chain. The intake sprocket 24 drives the intake camshaft 14 and the exhaust sprocket 26 drives the exhaust camshaft 16.

The intake camshaft 14 includes intake cam lobes 28 associated with each cylinder. Each intake cam lobe 28 interfaces with a respective rocker arm (not shown) to control movement of intake valves (not shown) for regulating opening and closing of intake ports (not shown). Similarly, the exhaust camshaft 16 includes exhaust cam lobes 30 associated with each cylinder. Each exhaust cam lobe 30 interfaces with a respective rocker arm (not shown) to control movement of exhaust valves (not shown) for regulating opening and closing of exhaust ports.

During engine 10 operation, the rocker arms roll and/or slide along a surface of the cam lobes 28, 30. Undulations along the surface of the cam lobes 28, 30, which are often creating during manufacture, may create objectionable levels of audible noise when the rocker arm encounters the surface of the cam lobes 28, 30.

To determine a boundary between cam lobes 28, 30 that generate objectionable levels of noise, it is preferred to create multiple test cam lobes (not shown) with intentional undulations believed to induce objectionable levels of noise. Each test cam lobe is created with undulations having a distinct amplitude and frequency suspected to induce noise that is slightly above and/or below a suspected noise threshold. The undulations of the test cam lobes are measured and then tested for chatter in the engine 10. The test cam lobes that generate an objectionable level of noise are classified as noisy and the remaining test cam lobes are classified as quiet. Although cam lobes 28, 30 are used herein for illustrative purposes, it can be appreciated that any manufactured part having undulations that may induce an objectionable level of noise may be used in accordance with the present invention.

Figure 2:
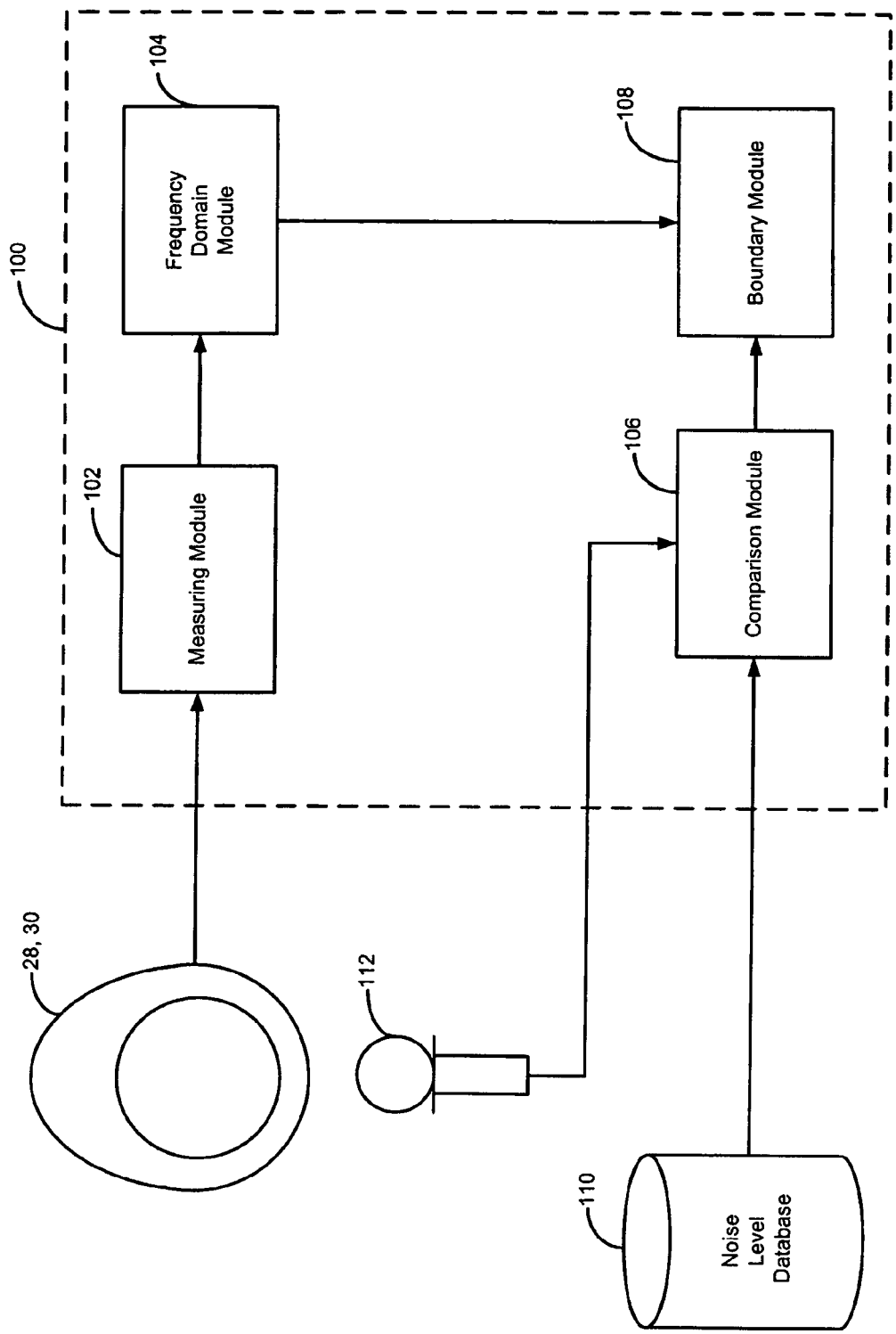
FIG. 2 is a functional block diagram of a chatter boundary system according to the present invention.

Referring now to FIG. 2, a chatter boundary system 100 is shown. The chatter boundary system 100 determines when an amplitude and frequency of the undulation may cause an unacceptable level of noise and generates a boundary between noisy and quiet cam lobes. The chatter boundary system 100 includes a measuring module 102, a frequency domain module 104, a comparison module 106, and a boundary module 108.

The measuring module 102 measures and collects samples of the amplitude and frequency of undulations along the surface of the cam lobes 28, 30. The frequency domain module 104 communicates with the measuring module 102 and converts the samples into frequency domain samples. More specifically, the frequency domain module 104 calculates a Fast Fourier transform (FFT) of the samples. As is commonly known in the art, a FFT is an efficient method to calculate a Discrete Fourier transform (DFT). Therefore, the frequency domain module 104 may calculate a DFT of the samples in accordance with the present invention.

The comparison module 106 communicates with a noise level database 110 and a microphone 112. The noise level database 110 contains a noise threshold that is experimentally determined to be a maximum acceptable noise level. The microphone 112 captures noise that is generated as the rocker arms encounter the cam lobes 28, 30 and generates a sound signal. The comparison module 106 compares the sound signal to the noise level threshold and classifies the sound signal as noisy or quiet.

The boundary module 108 communicates with the frequency domain module 104 and the comparison module 106. The boundary module 108 determines a boundary defining a distinction between acceptable and unacceptable levels of noise based on the FFT and the noisy and quiet classification of the samples. The boundary, which will be discussed in further detail herein, is a continuous boundary based on the amplitude and frequency of the samples.

Figure 3:
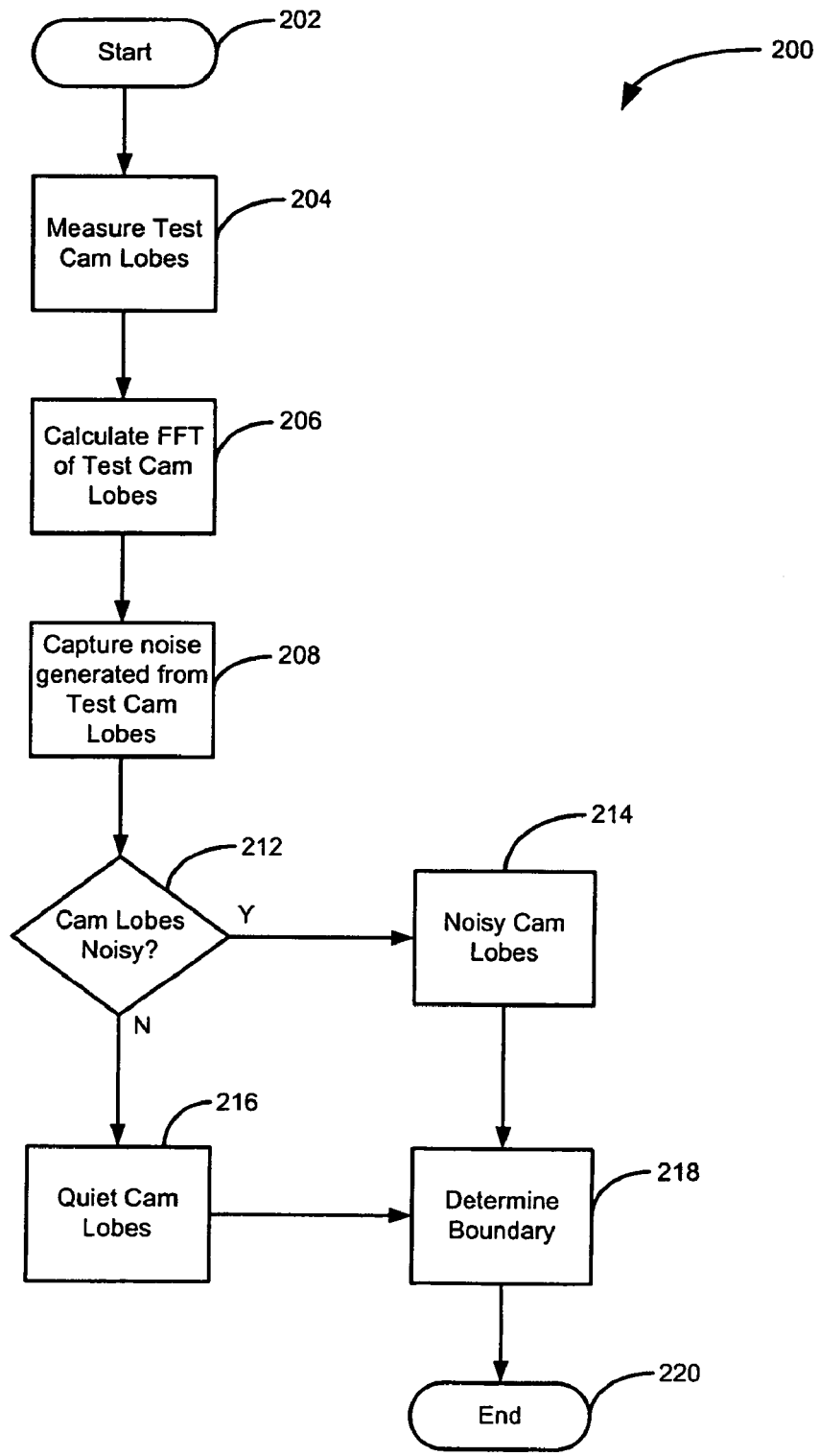
FIG. 3 is a flowchart of exemplary steps taken by the chatter boundary system.

Referring now to FIG. 3, the chatter boundary system 100 implements steps generally identified at 200 to determine the boundary. The process begins at step 202 when a user wishes to generate the boundary between acceptable and unacceptable noise levels. In step 204, the measuring module 102 measures and collects samples of undulations along the surface of the cam lobes 28, 30. In step 206, the frequency domain module 104 calculates the FFT of the samples. In step 208, the microphone 112 is used to capture noise generated by the cam lobes 28, 30. In step 212, the comparison module 106 compares the sound signal generated by the microphone 112 to the noise threshold in the noise level database 110. If the comparison module 106 determines that the sound signal is greater than the noise threshold, the sound signal is classified as noisy in step 214. If the comparison module 106 determines that the sound signal is not greater than the noise threshold, the sound signal is classified as quiet in step 216.

The boundary module 108 receives the noisy and quiet data and determines the boundary in step 218. The process ends in step 220.

Figure 4:
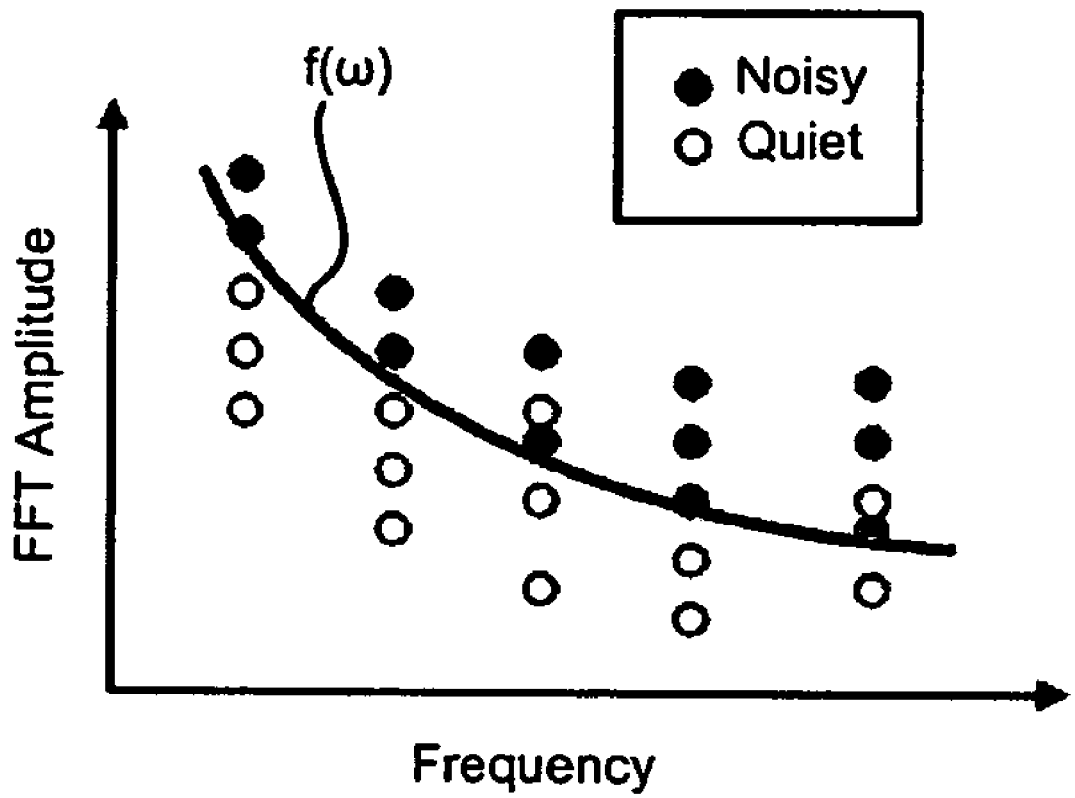
FIG. 4 is an exemplary plot of a Fast Fourier transform of sampled undulations from cam lobes versus a frequency of the undulations.

Referring now to FIG. 4, a plot of FFT amplitude versus frequency is shown. The boundary module 108 generates the boundary based on the FFT and the classification of the sound signal. As illustrated, the dark data points represent noisy samples and the light data points represent quiet samples. The boundary, which is continuous, appears between the noisy and quiet data points. The boundary module 108 selects the noisy samples with the lowest amplitude for each frequency and generates a continuous boundary $f(\omega)$ based on the selected noisy samples. In a preferred embodiment, an exponential function is used to generate a smooth curve that passes through (or near) the selected samples. The exponential function may be in the form of $f(\omega)=C_1\omega^{C_2}$, where $f(\omega)$ is the continuous boundary, $\omega$ is the chatter frequency, and $C_1$ and $C_2$ are constants determined to fit the curve.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A chatter boundary system, comprising:
   a measuring module that measures and collects samples of undulations in a manufactured part;
   a comparison module that compares a sound signal generated from said undulations to a noise threshold and that classifies said undulations as one of noisy and quiet based on said sound signal and said noise threshold;
   a boundary module that determines a continuous boundary between said undulations classified as noisy and said undulations classified as quiet based on said samples.

2. The chatter boundary system of claim 1 wherein:
   said undulations are classified as noisy when said sound signal exceeds said noise threshold; and
   said undulations are classified as quiet when said sound signal does not exceed said noise threshold.

3. The chatter boundary system of claim 2 further comprising a frequency domain module that communicates with said measuring module and that converts said samples into frequency domain samples.

4. The chatter boundary system of claim 3 wherein said boundary module plots said frequency domain samples that have undulations classified as noisy versus a frequency of said undulations.

5. The chatter boundary system of claim 4 wherein said boundary module plots said frequency domain samples that have undulations classified as quiet versus said frequency of said undulations.

6. The chatter boundary system of claim 5 wherein said boundary module fits a curve between said undulations classified as noisy and said undulations classified as quiet to determine said continuous boundary.

7. The chatter boundary system of claim 6 wherein said boundary module fits said curve using a minimum value of said frequency domain samples for said frequency of said undulations classified as noisy.

8. The chatter boundary system of claim 7 wherein said curve is of an exponential form.

9. The chatter boundary system of claim 7 wherein said frequency domain module converts said samples into said frequency domain samples using a Fast Fourier transform.

10. The chatter boundary system of claim 7 wherein said frequency domain module converts said samples into said frequency domain samples using a Discrete Fourier transform.

11. A method to determine a chatter boundary, comprising:

measuring and collecting samples of undulations in a manufactured part;

comparing a sound signal generated from said undulations to a noise threshold;

classifying said undulations as one of noisy and quiet based on said sound signal and said noise threshold; and determining a continuous boundary between said undulations classified as noisy and said undulations classified as quiet based on said samples.

12. The method of claim 11 wherein:

said undulations are classified as noisy when said sound signal exceeds said noise threshold; and said undulations are classified as quiet when said sound signal does not exceed said noise threshold.

13. The method of claim 12 further comprising converting said samples into frequency domain samples.

14. The method of claim 13 further comprising plotting said frequency domain samples that have undulations classified as noisy versus a frequency of said undulations.

15. The method of claim 14 further comprising plotting said frequency domain samples that have undulations classified as quiet versus said frequency of said undulations.

16. The method of claim 15 further comprising fitting a curve between said undulations classified as noisy and said undulations classified as quiet to determine said continuous boundary.

17. The method of claim 16 further comprising fitting said curve using a minimum value of said frequency domain samples for said frequency of said undulations classified as noisy.

18. The method of claim 17 wherein said curve is of an exponential form.

19. The method of claim 17 further comprising converting said samples into said frequency domain samples with a Fast Fourier transform.

20. The method of claim 17 further comprising converting said samples into said frequency domain samples with a Discrete Fourier transform.

* * * * *